(12) United States Patent
Shefelbine et al.

(10) Patent No.: US 9,309,370 B2
(45) Date of Patent: Apr. 12, 2016

(54) AMORPHOUS PERFLUOROPOLYMERS COMPRISING ZIRCONIUM OXIDE NANOPARTICLES

(75) Inventors: Terri A. Shefelbine, St. Paul, MN (US); Eric W. Adair, Hugo, MN (US); Werner M. A. Grootaert, Oakdale, MN (US); Brant U. Kolb, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 83 days.

(21) Appl. No.: 13/983,321

(22) PCT Filed: Jan. 26, 2012

(86) PCT No.: PCT/US2012/022663
§ 371 (c)(1),
(2), (4) Date: Sep. 10, 2013

(87) PCT Pub. No.: WO2012/106172
PCT Pub. Date: Aug. 9, 2012

(65) Prior Publication Data
US 2014/0011933 A1   Jan. 9, 2014

Related U.S. Application Data

(60) Provisional application No. 61/439,421, filed on Feb. 4, 2011.

(51) Int. Cl.
C08K 3/22 (2006.01)
C08L 27/18 (2006.01)
C08F 214/18 (2006.01)

(52) U.S. Cl.
CPC ................. *C08K 3/22* (2013.01); *C08F 214/18* (2013.01); *C08F 214/184* (2013.01)

(58) Field of Classification Search
USPC .................................................. 524/413, 544
See application file for complete search history.

(56) References Cited

U.S. PATENT DOCUMENTS

| 5,037,579 | A | 8/1991 | Matchett |
| 6,218,000 | B1 | 4/2001 | Rudolf |
| 6,376,590 | B2 | 4/2002 | Kolb |
| 6,803,402 | B2 | 10/2004 | Higashino |
| 7,351,471 | B2 | 4/2008 | Jing |
| 7,495,049 | B2 | 2/2009 | Lee |
| 2003/0228463 | A1* | 12/2003 | Abusleme ................ C08K 3/34 428/402 |
| 2005/0107544 | A1 | 5/2005 | Wang |
| 2005/0143523 | A1 | 6/2005 | Van Gool |
| 2005/0182199 | A1 | 8/2005 | Jing |
| 2006/0147723 | A1* | 7/2006 | Jing et al. ..................... 428/421 |
| 2007/0117900 | A1 | 5/2007 | Lee |
| 2010/0240791 | A1 | 9/2010 | Sugiyama |
| 2010/0276374 | A1 | 11/2010 | Kolb |
| 2010/0297433 | A1 | 11/2010 | Kourtakis et al. |
| 2013/0289188 | A1* | 10/2013 | Shefelbine et al. .......... 524/413 |

FOREIGN PATENT DOCUMENTS

| EP | 1 770 120 | 4/2007 |
| JP | 2000-0119468 | 4/2000 |
| JP | 2002-037666 | 2/2002 |
| JP | 2007-291308 | 11/2007 |
| TW | 200940340 | 10/2009 |
| TW | 201005020 | 2/2010 |
| WO | WO-00/10934 | * 3/2000 |
| WO | WO 03-57766 | 7/2003 |
| WO | WO 2006-087942 | 8/2006 |
| WO | WO 2006/128128 | 11/2006 |
| WO | WO 2007/041227 | 4/2007 |
| WO | WO 2007/120122 | 10/2007 |
| WO | WO 2007-148779 | 12/2007 |
| WO | WO 2010/011368 | 1/2010 |
| WO | WO 2010/147867 | 12/2010 |
| WO | WO 2011-162971 | 12/2011 |
| WO | WO 2012-067936 | 5/2012 |
| WO | WO-2012/067936 A3 | * 5/2012 |
| WO | WO 2012-067937 | 5/2012 |
| WO | WO-2012/106172 A2 | * 8/2012 |

OTHER PUBLICATIONS

International Search Report for PCT International Application No. PCT/US2012/022663, mailed on Aug. 22, 2012, 4 pages.

* cited by examiner

*Primary Examiner* — Peter D Mulcahy
*Assistant Examiner* — Henry Hu
(74) *Attorney, Agent, or Firm* — Julie Lapos-Kuchar

(57) ABSTRACT

Described herein is a curable fluoropolymer composition comprising: an amorphous perfluoropolymer; and nanoparticles of zirconium oxide.

18 Claims, No Drawings

AMORPHOUS PERFLUOROPOLYMERS COMPRISING ZIRCONIUM OXIDE NANOPARTICLES

CROSS REFERENCE TO RELATED APPLICATIONS

This application is a national stage filing under 35 U.S.C. 371 of PCT/US2012/022663, filed Jan. 26, 2012, which claims priority to U.S. Provisional Application No. 61/439,421, filed Feb. 4, 2011, the disclosure of which is incorporated by reference in its/their entirety herein.

TECHNICAL FIELD

A composition comprising an amorphous perfluoropolymer and zirconium oxide nanoparticles is described.

BACKGROUND

Fluoroelastomers, especially perfluorinated elastomers, are used in a wide variety of applications in which severe environments are encountered, specifically end uses where exposure to high temperatures and aggressive chemicals occur. For example, these polymers are often used as seals for aircraft engines, in semiconductor manufacturing equipment, in oil-well drilling devices, and in sealing elements for industrial equipment used at high temperatures.

In the semiconductor industry, perfluoroelastomers are used in processes that require resistance to $NF_3$ plasma. This industry has stringent requirements on material purity especially around metal ions. Furthermore, if the perfluoroelastomers shed particles that can deposit in the process chambers, the particles should be of a size, which avoid introducing defects into the semiconductors.

SUMMARY

There is a desire to identify a perfluorinated elastomer which has reduced weight loss during plasma etching. It is also desirable to identify processes for making fluoropolymer compositions, which reduce process steps and or reduce processing cost.

In one aspect, a curable fluoropolymer composition is described comprising: an amorphous perfluoropolymer; and nanoparticles of zirconium oxide.

In one embodiment, the curable fluoropolymer composition comprises substantially no zinc oxide.

In another aspect, a cured article is described comprising: a perfluoroelastomer; and nanoparticles of zirconium oxide.

In another aspect, a method of making an article is described comprising: providing a curable fluropolymer composition of an amorphous perfluoropolymer and nanoparticles of zirconium oxide; and then curing the composition.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B);

"latex" as used herein refers to a dispersion of polymer particles in an aqueous continuous phase; and "organic" has the common meaning in the art, for example, organic compounds are carbon-containing compounds with some exceptions/exclusions including: binary compounds such as carbides, carbon oxides, carbon disulfide; ternary compounds such as metallic cyanides, phosgene, carbonyl sulfide; and metallic carbonates, such as calcium carbonate.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure relates amorphous perfluoropolymer compositions comprising zirconium oxide nanoparticles. The amorphous perfluoropolymer compositions may then be subsequently cured to form perfluoroelastomer articles.

The zirconium oxide nanoparticles used in the present disclosure are preferably substantially spherical.

The zirconium oxide nanoparticles have an average diameter of the primary particle of at least 3 nm, 5 nm, 8 nm, 10 nm, 15 nm or even 20 nm; at most about 100 nm, 50 nm, 30 nm, or even 25 nm. The zirconium oxide nanoparticles used in the composition of the present disclosure are typically unaggregated. If the zirconium oxide nanoparticles are an aggregation of primary particles, then the maximum cross-sectional dimension of the aggregated nanoparticle is within the range of about 3 nm to about 100 nm, about 3 nm to about 50 nm, about 3 nm to about 20 nm, or even about 3 nm to about 10 nm.

The inorganic nanoparticles may be in the form of a colloidal dispersion such as those described in U.S. Pat. No. 5,037,579 (Matchett).

Although the zirconium oxide nanoparticle may be essentially pure, it may contain small amounts (e.g., less than 20, 10, 5, 1, 0.5, 0.3, or even 0.2 wt %) of stabilizing ions such as ammonium and alkaline metal ions, or it may be a combination of metal oxides such as a combination of titania and zirconia. In one embodiment, using ICP (inductively coupled plasma) atomic emission spectroscopy, the zirconium oxide nanoparticle may comprise less than 500, 100, 50, or even 25 ppm of total other metals (such as Li, Na, K, Mg, Ca, Sr, Ti, V, Cr, Mn, Fe, CO, Ni, Cu, SN, Al, P, Sb, and Mo).

In one embodiment, the surface of the zirconium oxide nanoparticle is reversibly associated with an organic compound.

In one embodiment, the zirconium oxide nanoparticle may be associated with an organic compound via ionic bonding, hydrogen bonding, Van der waals forces, etc. For example, organic compounds with an acid end group, (e.g., a carboxylate salt, a carboxylic acid, a phosphoniate, a phosphonic acid, or a hydroxylamine) may ionically bond to the surface of the zirconium oxide nanoparticle.

For example, zirconium oxide nanoparticles may be surface treated through adsorption of acidic or basic compounds onto the nanoparticle's surface. Oxide particles such as zirconia may be treated with an acidic compound, such as with carboxylic acids, phosphonic acids, and sulfonic acids; an acidic function derived from oxyacids of boron, carbon, phosphorus, and sulfur; or combinations thereof. Exemplary organic compounds that may be non-covalently bonded to the zirconium oxide nanoparticles include: acetic acid or short chain organic molecules comprising an acidic end group such as polyalkyleneoxide, a polyol or a hydroxyl-substituted moiety having a carboxylate salt, carboxylic acid, phosphoniate, phosphonic acid, or a hydroxyamine end group.

In one embodiment, the weight of organic moieties on the surface of the zirconium oxide nanoparticle as compared to the weight of the zirconium oxide nanoparticle is less than 50, 40, 30, 25, 20, 10, 5, 1, or even 0.5%.

Surface modification of nanoparticles is known in the art. The zirconium oxide may be treated with an acidic compound, such as with carboxylic acids, phosphonic acids, and sulfonic acids or an acidic function derived from oxyacids of boron, carbon, phosphorus, and sulfur.

The curable fluoroelastomer compositions according to the present disclosure comprise an amorphous perfluoropolymer along with nanoparticles of zirconium oxide.

The nanoparticles may be added during compounding with the amorphous perfluoropolymer, or they may be present during the polymerization of the amorphous perfluoropolymer latex such as described in U.S. Prov. Appl. No. 61/358,085 (Baran et al.), or in the coagulating of the amorphous perfluoropolymer latex such as described in U.S. Prov. Appl. No. 61/415,018 (Shefelbine et al.) and 61/415031 (Shefelbine et al.).

The zirconium oxide nanoparticle in the curable composition is used in an amount of at least 10 ppm, 50 ppm, 100 ppm, 500 ppm, 1000 ppm, 2000 ppm, 5000 ppm, 7500 ppm, or even 10000 ppm; at most 100000 ppm, 150000 ppm, 200000 ppm, 250,000, or even 400000 ppm when compared to the weight of the curable composition.

The amorphous perfluoropolymer of the present disclosure is derived from perfluorinated monomers, in other words, all of the hydrogens are replaced with halogens, specifically fluorinate atoms. Such perfluorinated monomers include: fluorinated olefins such as tetrafluoroethylene, chlorotrifluoroethylene, and hexafluoropropylene; fluorinated ethers such as perfluoromethylvinyl ether, perfluoro(3-methoxy-propylvinyl ether), $CF_2=CF-O-CF_2-O-CF_2CF_2CF_3$, and $CF_2-CF-O-CF_2-O-CF_2CF_2CF_2-O-C_3F_7$; fluorinated alkoxides such as hexafluoropropylene oxide; fluorinated styrenes, fluorinated siloxanes; and combinations thereof.

Additionally, cure-site monomers as are known in the art may be added during the polymerization, so that the amorphous fluoropolymer latex comprises iodine-, bromine- and/or nitrogen-containing cure site groups, which may be subsequently used to cross-link the amorphous fluoropolymer composite.

In one embodiment, iodine- and bromine-cure site groups may be derived from monomers of the formula: $CX_2=CX(Z)$, wherein: (i) X each is independently H or F; and (ii) Z is I, Br, $R_f$-U wherein U=I or Br and $R_f$=a perfluorinated or partially perfluorinated alkylene group optionally containing O atoms. In addition, non-fluorinated bromo- or iodo-olefins, e.g., vinyl iodide and allyl iodide, can be used. Exemplary iodine- and bromine-cure site groups may be derived from: $CH_2=CHI$, $CF_2=CHI$, $CF_2=CFI$, $CH_2=CHCH_2I$, $CF_2=CFCF_2I$, $CH_2=CHCF_2CF_2I$, $CH_2=CHCF_2CF_2CH_2CH_2I$, $CH_2=CH(CF_2)_4I$, $CH_2=CH(CF_2)_4CH_2CH_2I$, $CH_2=CH(CF_2)_6I$, $CH_2=CH(CF_2)_6CH_2CH_2I$, $CF_2=CFCH_2CH_2I$, $CF_2=CFCF_2CF_2I$, $CF_2=CFOCF_2CF_2I$, $CF_2=CFOCF_2CF_2CH_2CH_2I$, $CF_2=CFOCF_2CF_2CF_2I$, $CF_2=CFOCF_2CF_2CF_2CH_2CH_2I$, $CF_2=CFOCF_2CF_2CH_2I$, $CF_2=CFOCF_2CF_2CF_2CH_2I$, $CF_2=CFCF_2OCH_2CH_2I$, $CF_2=CFO(CF_2)_3-OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFCl$, $CF_2=CFCF_2Cl$, and mixtures thereof.

In one embodiment, the nitrogen-containing cure site group may comprise for example, an aceate, an adipate, a nitrile, an amidine, an imidate, an amidoxime, an amidrazone group, or combinations thereof.

Exemplary nitrogen-containing cure site group may be derived from: $CF_2=CF-CF_2-O-R_f-CN$, $CF_2=CFO(CF_2)_wCN$, $CF_2=CFO[CF_2CF(CF_3)O]_g(CF_2)_vOCF(CF_3)CN$, $CF_2=CF[OCF_2CF(CF_3)]_kO(CF_2)_uCN$, and mixtures thereof, wherein w represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples include perfluoro(8-cyano-5-methyl-3,6-dioxa-1-octene), $CF_2=CFO(CF_2)_5CN$, and $CF_2=CFO(CF_2)_3OCF(CF_3)CN$.

The curable fluoropolymer composition of the present disclosure may be cured using compounds and techniques known in the art. A curing agent may be added to the curable fluoropolymer composition to cure the amorphous fluoropolymer into a perfluoroelastomer. Such curing agents are known in the art and include, for example: a peroxide, a bisaminophenols such as bis ortho aminophenol, an adipates, an amidine, an acetate, a triazine-forming curing agent, (e.g., an onium, such as ammonium, phosphonium, sulfonium, or iodonium), or combinations thereof. Preferably, when the amorphous perfluoropolymer comprises at least one of an iodine- and a bromine-containing cure site group, the curing agent is a peroxide. Preferably, when the amorphous perfluoropolymer comprises a nitrogen-containing cure site group the curing agent is selected from an onium.

Optional additives may be added to the curable fluoropolymer composition including, for example, stabilizers (e.g., antioxidants or UV- and light stabilizers), anti-microbials, pigments (e.g., dyes), flame retardants, medicaments, blowing agents, fillers, and the like. The use of such additives to improve physical properties, such as tensile strength, density, and modulus, is well known to those of ordinary skill in the art.

Articles derived from the fluoropolymer composition presently disclosed are useful for in the semiconductor industry for the microchip manufacturing process where the fluoroelastomer may be used in seals of microchip fabrication equipment. In industries such as the semi-conductor, biotechnology, and pharmaceuticals, there is a desire for cleaner fluoroelastomer parts (such as O-rings, quick connect seals, gaskets). In other words, fluoroelastomer parts having extremely low metal ion content. With the exception of zirconium, in one embodiment, the curable fluoropolymer comprises less than 1000, 500, or even 250 ppm of total metal content.

In one embodiment, the zirconium oxide nanoparticle in the cured article is used in an amount of at least 5, 10, 15, 20, or even 25 pphr (parts per hundred rubber); at most 60, 50, 40, or even 30 pphr.

Because of the stringent requirements related to using perfluoroelastomers in the semiconductor industry. Various test methods have been developed to predict whether or not the perfluoroelastomer article is suitable for use. One such test method is related to weight loss, where the perfluoroelastomer article is exposed to the plasma and the loss of weight is determined.

Traditionally, zinc oxide is added to the curable fluoropolymer composition as an acid acceptor in peroxide cure systems. As shown in the examples below, it has been found that the perfluoroelastomer articles may be substantially free of zinc oxide, in other words comprising none or less than 50, 25, 10, 5, 1, or even 0.001 pphr, and yield improved plasma resistance as compared to the same composition comprising zinc oxide. Elimination of the zinc oxide in the formulation may offer the advantage of reduced cost and increasing the water resistance of a compound.

EXAMPLES

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

These abbreviations are used in the following examples: g=grams, min=min, hr=hour, mL=milliliter, L=liter, ppm=parts per million, pphr=parts per hundred rubber. If not otherwise indicated chemicals are available from Sigma-Aldrich, St. Louis, Mo.

MATERIALS 15 nm Zirconia Preparation:

The nanoparticle sol was prepared according to the method of Example 1 of U.S. Publ. No. 2010276374 (Kolb et al.) resulting in a Z average particle size of 15 nm (measured by photon correlation spectroscopy). The resulting sol was concentrated by evaporation. The acid content of the zirconia nanoparticle sol was reduced by placing this sol in a bag of Spectra/Por molecular porous membrane tubing (Spectra/Por Dialysis membrane molecular weight cut off 12,000-14,000 g/mol, available from Spectrum Laboratories, Inc. Rancho Dominguez, Calif.). The bag containing the sol was then placed in an excess of deionized water and agitated with a magnetic stir bar. The resulting sol had a solids content of 30.5 wt. %. The 30.5% wt. solids sol was further diluted with deionized water to 4.0% wt. solids.

METHODS

Filler Solids Determination Method

The refractive indexes of thin films of nanocomposite crumb were measured using an Abbe refractometer. The volume fraction of nanoparticles in the film were calculated according to the formula:

| Material | Description and Source |
|---|---|
| 15 nm zirconia | Nanoparticle zirconia solution. See "Zirconia Sol Preparation" |
| Zinc oxide | Zinc oxide commercially available under the trade designation "UPS-1", from Zinc Corporation of America. |
| Latex A | Latex of bromine cure site peroxide curable amorphous perfluoropolymer prepared by aqueous emulsion polymerization having 66.2 mol % of tetrafluoroethylene, 33.7 mol % of perfluoromethyl vinylether and 0.36 wt % bromine (based on weight of perfluoroelastomer) added as bromotrifluoroethylene. Solids content 34.4 wt %. |
| Latex B | Latex of nitrile cure site containing amorphous perfluoropolymer prepared by aqueous emulsion polymerization having 66.8 mol % TFE, 32.0 mol % perfluoromethylvinyl ether (PMVE) and 1.2 mol % of a nitrile-containing cure site monomer, CF2=CFO(CF2)5CN (MV5CN). Solids content 30.3 wt %. |
| PFE #1 | Curable amorphous perfluoropolymer, commercially available under the trade designation "PFE90X" from Dyneon LLC, Oakdale, MN |
| Organic peroxide | Organic peroxide commercially available under the trade designation "VAROX DBPH-50" from R. T. Vanderbilt, Norwalk, CT |
| TAIC cross-linker | 72% triallylisocyanurate on 28% inert mineral carrier, commercially available under the trade designation "PLC(TAIC)72" from Rhein Chemie Corp., Chardon, OH |
| TBPH | Tetrabutylphosphonium hydroxide solution 40%, commercially available from Sigma-Aldrich, St. Louis, MO. |
| TBAH | Tetrabutylammonium hydroxide 40%, commercially available from Sigma-Aldrich, St.Louis, MO. |
| 1.7 micron silica | 1.7 micron median diameter fine ground silica powder, commercially available under the trade designation "MINUSIL 5" from U.S. Silica Company, Berkeley Springs, West Virginia |
| 20 nm silica #2 | Silica sol with mean particle size of 20 nm and a solid content about 50 wt. %, commercially available under the trade designation "NALCO 1050" from Nalco Chemical, Naperville, Illinois |
| 20 nm PEGylated silica | Nalco 2327 silica nanoparticles (100 g, 40 wt %) was diluted to 20 wt % with deionized water (100 g). The solution was stirred for 15 minutes. Subsequently to the solution was added PEG-silane (Mw = 500, 4.96 g, 40% surface coverage) and the resulting mixture was continuously stirred for additional 3-4 hrs at room temperature. The solution was then heated at 70° C. overnight. |
| 5 nm PEGylated silica | Nalco 2326 silica nanoparticles (200 g, 16.7 wt %) was diluted to 10 wt % with deionized water (134 g). The solution was stirred in a glass jar for 15 minutes. Subsequently to the solution was added PEG-silane (Mw = 500, 10.02 g) and the resulting mixture was continuously stirred for additional 3-4 hrs at room temperature. The solution was then heated at 70° C. overnight. |
| PEG-silane | PEG-silane (2-[methoxy(polyethyleneoxy) propyl]trimethoxysilane) was obtained from Gelest Inc. Morrisville, PA. |

$$v_{fa} = \frac{R_c - R_p}{R_a - R_p}$$

The parts per hundred rubber of the nanoparticles is then:

$$w_a = \frac{\frac{v_{fa} * w_p}{\rho_p}}{\left(\frac{1}{\rho_a} - \frac{v_{fa}}{\rho_a}\right)}$$

Where $v_{fa}$ is the volume fraction of the nanoparticles, $R_a$ is the refractive index of the nanoparticles, $R_p$ is the refractive index of the polymer, $R_e$ is the refractive index of the composite (measured), $\rho_a$ is the density of the nanoparticles, $\rho_p$ is the density of the polymer, and $w_p$ is by definition=100, since this is parts per hundred rubber of the rubber. The refractive index and densities used in this calculation:

| Material | Density (g/cm³) | Refractive index |
| --- | --- | --- |
| PFE | 1.8 | 1.327 |
| Silica (SiO₂) | 2.19 | 1.460 |
| Zirconia (ZrO₂) | 5.6 | 2.100 |

Plasma Weight Loss Method

Plasma testing was conducted on o-rings using a Reacting Ion Etching (RIE) apparatus ("Plasma Lab 100", Oxford Instruments, Tubney Woods, Abingdon, Oxfordshire, UK) under the following conditions. The o-rings were de-flashed using a scalpel and stretched 10% over an aluminum fixture. The weight of the o-ring was recorded before exposure to plasma by difference between the o-ring+fixture weight and the fixture weight. The o-rings were exposed to $NF_3$ plasma for at least three one hour increments. After each hour the weight of the o-rings and fixtures were recorded to an accuracy of 0.1 mg. The weight percentage that had been lost was then calculated for each measurement. The percent weight loss per hour was calculated as the slope of the line plotted from time (hours, x-axis) and % weight loss (y-axis). The plasma conditions were as follows:
  Pressure: 20 mTorr
  Flowrate NF3: 5 standard cubic centimeters per minute (sccm)
  Power: 25 W

EXAMPLES

Comparative Example 1

70 g of PFE #1 was compounded with 7.0 g of "1.7 micron silica", 1.05 g "organic peroxide" and 1.75 g "TAIC crosslinker" using a two-roll rubber mill. O-ring made from the resulting compound with a 1 inch (25.4 mm) nominal ID (inner diameter), 1¼ inch (31.75 mm) nominal OD (outer diameter), ⅛ inch (3.175 mm) nominal were cured at 177° C. for 10 min and subsequently post cured in air at 232° C. for 16 hrs.

Comparative Example 2 was prepared and cured as described in Comparative Example 1, except that 3.5 g "zinc oxide" was added with the "organic peroxide" and "TAIC crosslinker". O-rings were produced as in Comparative Example 1.

Comparative Example 3

To a stirred dispersion of 81.60 g of "20 nm PEGylated silica", 529.2 g of "Latex A" was added over the course of 30 min. The mixture was stirred for an additional 30 min and allowed to settle for 30 min. The solids were filtered out of the water with cheese cloth, squeezed gently, and returned to approximately 500 g of hot deionized water and rinsed by shaking for an additional hr. The filtering and rinsing steps were repeated two additional times. After the rinsing step, the solids were squeezed gently in the cheese cloth and dried in a batch oven for 16 hrs at 100° C. After drying the yield was 191.3 g of material. By the "Filler Solids Determination Method" listed under METHODS this material had a silica solids content of 10.5 pphr silica nanoparticles. On a two roll mill, 90 g of this composite was compounded with 4.09 g "zinc oxide", 1.23 g "TAIC crosslinker", and 2.05 g "organic peroxide". O-rings made with a 1 inch nominal ID, 1¼ inch nominal OD, ⅛ inch nominal cross section were cured at 177° C. for 10 min and post cured for 16 hrs at 450° F.

Comparative Example 4

529.2 g of "Latex A" was added to a stirred dispersion of 81.60 g of "20 nm PEGylated silica" over the course of 30 min. The mixture was stirred for an additional 30 min and allowed to settle for 30 min. The solids were filtered out of the water with cheese cloth, squeezed gently, and returned to approximately 600 g of hot deionized water and rinsed by shaking for an additional hr. The filtering and rinsing steps were repeated two additional times. After the rinsing step, the solids were squeezed gently in the cheese cloth and dried in a batch oven for 16 hrs at 100° C. After drying the yield was 191.3 g. By the "Filler Solids Determination Method" listed under METHODS this material had a silica solids content of 10.5 pphr silica nanoparticles. On a two roll mill, 90 g of this composite was blended with 1.23 g "TAIC crosslinker", and 2.05 g "organic peroxide". O-rings made with a 1 inch nominal ID, 1¼ inch nominal OD, and a ⅛ inch nominal cross section were cured at 177° C. for 10 min and post cured for 16 hrs at 450° F.

Comparative Example 5

593.20 g of Latex B and 10 g of "TBAH" solution were added dropwise over the course of 22 min to a stirred solution of 93.35 g of "5 nm PEGylated silica". The mixture was stirred an additional 45 min and then allowed to settle for 30 min. The solids were filtered out of the water with cheese cloth, squeezed gently, and returned to approximately 500 mL of hot deionized water. This mixture was then stirred for an additional hr to rinse the material and the solid filtering and rinsing procedure was repeated. The solids were placed in a batch oven at 100° C. for 17 hrs. By the "Filler Solids Determination Method" listed under METHODS the gum had a nanoparticle content of 4.62 pphr. 100 g of this material was milled on a two roll mill for 18 min to form sheets from which to cut pre-forms. O-rings made with a 1 inch nominal ID, 1¼ inch nominal OD, and a ⅛ inch nominal cross section were cured for 20 min at 177° C. The o-rings were post cured with a temperature step profile in a circulating air oven as follows. Ramp from 40-150° C. in 1 hr. Hold at 150° C. for 1 hr. Ramp from 150-200° C. in 1 hr. Hold at 200° C. for 2 hrs. Ramp from 200-250° C. in 1 hr. Hold at 250° C. for 6 hrs. Ramp from 250-300° C. in 1 hr. Hold at 300° C. for 4 hrs. Ramp from 300-40° C. in 2 hrs.

Comparative Example 6

To 36.35 g of "20 nm silica #2" was added 36.35 g of deionized water to make a 25 wt. % solution of silica nanoparticles. While this solution was stirred 530.0 g of "Latex A" was added over the course of 30 min. This mixture was stirred an additional 30 minutes then allowed to settle for 30 minutes. The solids were filtered out of the water with cheese cloth, squeezed gently, and returned to approximately 500 mL of hot deionized water. This mixture was then stirred for an additional hr to rinse the material and the solid filtering and rinsing procedure was repeated twice. The solids were placed in a batch oven at 104° C. for 16.5 hours. By the "Filler Solids Determiantion Method" listed under METHODS the gum had a nanoparticle content of 1.0 pphr. On a two roll mill, 80 g of this composite was compounded with 3.64 g "zinc oxide", 1.82 g "TAIC crosslinker", and 1.09 g "organic peroxide". O-rings made with a 1 inch nominal ID, 1¼ inch nominal OD, and a ⅛ inch nominal cross section were cured at 177° C. for 10 min and post cured for 16 hrs at 450° F.

Example 1

1455.10 g of "Latex A" (34.36% solids) was added to a stirred solution of 2500.95 g of "15 nm zirconia" over the course of 22 min. The mixture was then stirred for 28 min and allowed to settle for 40 min. The solids were filtered out of the water with cheese cloth, squeezed gently, and returned to approximately 2000 mL of hot deionized water. This mixture was then stirred for an additional 50 minutes to rinse the material and the solid filtering and rinsing procedure was repeated. The final recovered solids were placed in a batch oven at 100° C. for 18 hrs. By the "Filler Solids Determination Method" listed under METHODS this gum had a nanoparticle content 18 pphr $ZrO_2$ nanoparticles. 64.96 g of this composite was blended on a two roll mill with 45.04 g of commercial peroxide cured PFE to yield a composite with 10.0 pphr $ZrO_2$ nanoparticles. This composite was then blended with 1.49 g organic peroxide and 2.48 g "TAIC crosslinker" to form pre-form sheets. O-rings made with a 1 inch nominal ID, 1¼ inch nominal OD, and a ⅛ inch nominal cross section were cured at 177° C. for 10 min and post cured in air at 232° C. for 16 hrs.

Example 2 was prepared identically to Example 1 except that the final composite of 10.0 pphr zirconia nanoparticles was blended with 4.95 g zinc oxide in addition to the "organic peroxide" and "TAIC crosslinker" to form pre-form sheets. O-rings were produced as in Example 1.

Example 3

593.00 g of "Latex B" and 10 g of "TBPH" were added dropwise to a stirred solution of 76.56 g of "15 nm zirconia" over the course of 22 min. The mixture was stirred an additional 30 min and then allowed to settle for 1 hr. The solids were filtered out of the water with cheese cloth, squeezed gently, and returned to approximately 600 mL of hot deionized water. This mixture was then stirred for an additional hr to rinse the material and the solid filtering and rinsing procedure was repeated twice. The solids were placed in a batch oven at 100° C. for 17 hrs. By the "Filler Solids Determination Method" listed under METHODS the gum had a nanoparticle content of 2.14 pphr. 100 g of this material was milled on a two roll mill for 20 min to form sheets from which to cut pre-forms. O-rings were made with a 1 inch nominal ID, 1¼ inch nominal OD, and a ⅛ inch nominal cross section and o-rings were press cured for 20 min at 177° C. The o-rings were post cured with a temperature step profile in a circulating air oven as in Comparative Example 5.

An O-ring from each of the Examples (EX) and Comparative Examples (CE) were then tested using the Plasma Weight Loss Method. Shown in Table 1 is a summary of the results along with the polymer, curative and particle type/size used and how much particle loading was in each sample.

TABLE 1

| Example | Polymer | Curatives | Particle type/size | Particle loading, pphr | Wt. loss rate (%/hr.) |
|---|---|---|---|---|---|
| EX1 | Latex A | Organic peroxide:TAIC crosslinker | 15 nm zirconia | 10.0 | 0.121 |
| EX2 | Latex A | Organic peroxide:TAIC crosslinker:zinc oxide | 15 nm zirconia | 10.0 | 0.140 |
| EX3 | Latex B | TBPH | 15 nm zirconia | 2.14 | 0.351 |
| CE1 | PFE #1 | Organic peroxide:TAIC crosslinker | 1.7 micron silica | 10.0 | 0.412 |
| CE2 | PFE #1 | Organic peroxide:TAIC crosslinker:zinc oxide | 1.7 micron silica | 10.0 | 0.279 |
| CE3 | Latex A | Organic peroxide:TAIC crosslinker:zinc oxide | 20 nm PEGylated silica | 10.5 | 0.330 |
| CE4 | Latex A | Organic peroxide:TAIC crosslinker | 20 nm PEGylated silica | 10.5 | 0.434 |
| CE5 | Latex B | TBAH | 5 nm PEGylated silica | 4.62 | 0.667 |
| CE6 | Latex B | Organic peroxide:TAIC crosslinker:zinc oxide | 20 nm silica #2 | 1.0 | 0.393 |

As shown in Table 1 above, zinc oxide appears to improve plasma resistance when using silica particles (compare CE1 and CE2). However, in Examples 1 and 2, which used the nano-sized zirconium oxide particles, there appeared to be an improvement in plasma resistance when zinc oxide was not present. Also shown in Table 1, above, is Example 3 and Comparative Example 5, which used the same polymer and curative, however different types of nanoparticles. EX 3, which used zirconia has a lower weight loss than CE5, which used PEGylated silica.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A curable composition comprising:
   an amorphous perfluoropolymer; and
   nanoparticles of zirconium oxide wherein the nanoparticles of zirconium oxide have an average diameter of less than 100 nm and wherein the curable composition is in the shape of a seal, a gasket, or an O-ring.

2. The curable composition of claim 1, wherein the amorphous perfluoropolymer comprises at least one of an iodine- and a bromine-containing cure site group.

3. The curable composition of claim 1, wherein the amorphous perfluoropolymer comprises a nitrogen-containing cure site group.

4. The curable composition of claim 3, wherein the nitrogen-containing cure site comprises at least one of a nitrile, an imidate, an amidoxime, and an amidrazone.

5. The curable composition of claim 1, wherein the amorphous perfluoropolymer is derived from a perfluorinated vinyl ether.

6. The curable composition of claim 1, wherein the amorphous perfluoropolymer is derived from a monomer comprising at least one of a tetrafluoroethylene, hexafluoropropylene, perfluoromethylvinyl ether, perfluoro(3-methoxy-propylvinyl ether), $CF_2=CF—O—CF_2—O—CF_2CF_2CF_3$, and $CF_2=CF—O—CF_2—O—CF_2CF_2CF_2—O—C_3F_7$.

7. The curable composition of claim 1, wherein the surface of the nanoparticles of zirconium oxide is modified with (i) an acidic compound, (ii) a compound comprising an acidic function derived from an oxyacid, or (iii) an acidic compound and a compound comprising an acidic function derived from an oxyacid.

8. The curable composition of claim 7, wherein the acidic compound comprises at least one of carboxylic acid, phosphonic acid and sulfonic acid and wherein the oxyacid of the compound comprising an acidic function derived from an oxyacid comprises at least one of boron, carbon, phosphorous, and sulfur.

9. The curable composition of claim 1, further comprising a curing agent.

10. The curable composition of claim 9, wherein the curing agent comprises at least one of: a peroxide, a bisaminophenol, a triazine-forming curing agent, and an onium.

11. The curable composition of claim 10, wherein the curable fluoropolymer composition comprises the peroxide and less than 50 parts zinc oxide per hundred parts of the amorphous perfluoropolymer.

12. The curable composition of claim 1, wherein the nanoparticles of zirconium oxide are not irreversibly associated with the amorphous perfluoropolymer.

13. The curable composition of claim 1, wherein the surface of the nanoparticles of zirconium oxide is non-covalently bonded with an organic compound.

14. The curable composition of claim 13, wherein the organic compound comprises at least one of: acetic acid, a polyalkyleneoxide, a polyol, and a hydroxyl-substituted moiety having at least one end group selected from a carboxylate salt, a carboxylic acid, a phosphoniate, a phosphonic acid, or a hydroxylamine.

15. The curable composition of claim 1, wherein the curable fluoropolymer composition comprises at least 10 ppm and at most 100,000 ppm of the nanoparticles of zirconium oxide.

16. The curable composition of claim 1, wherein the curable composition with the exception of zirconium, comprises less than 1000 ppm of total metal content.

17. A cured article is obtained by curing a curable composition comprising:
   an amorphous perfluoropolymer; and
   nanoparticles of zirconium oxide wherein the nanoparticles of zirconium oxide have an average diameter of less than 100 nm and wherein the cured article is in the shape of a seal, a gasket, or an O-ring.

18. A method of making an article comprising: providing a curable composition of claim 1; and then curing the curable composition.

* * * * *